UNITED STATES PATENT OFFICE.

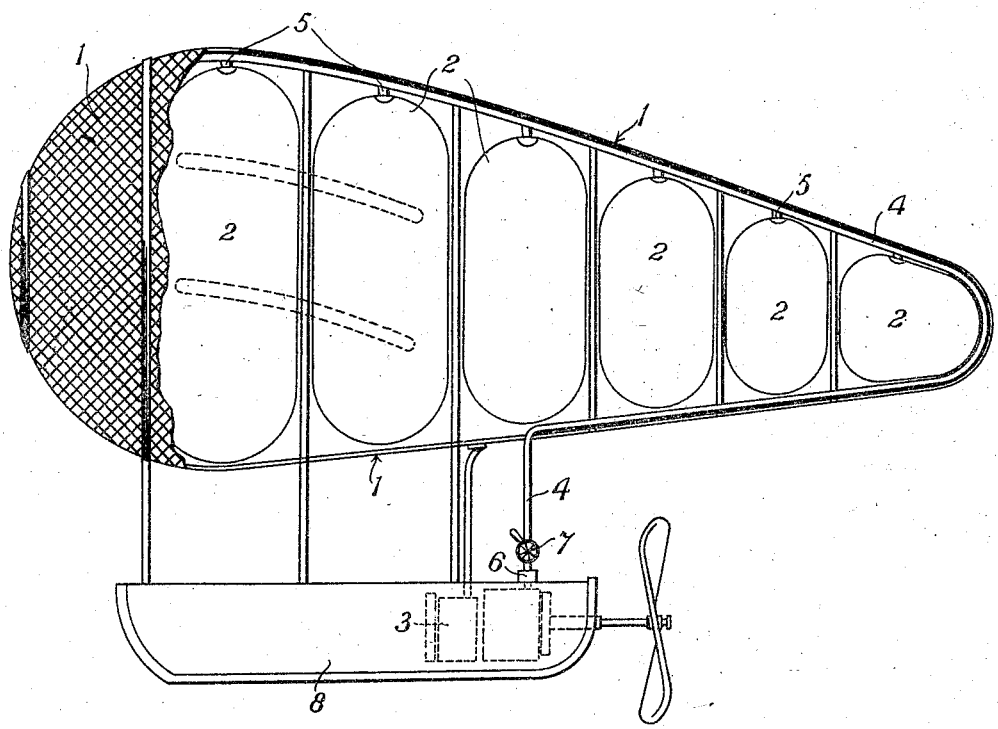

HENRY WILSON-FOX, OF LONDON, ENGLAND.

AIRCRAFT.

1,298,133.        Specification of Letters Patent.    Patented Mar. 25, 1919.

Application filed November 21, 1918. Serial No. 263,605.

*To all whom it may concern:*

Be it known that I, HENRY WILSON-FOX, a subject of the King of Great Britain, and a resident of London, England, have invented certain new and useful Improvements in Aircraft, of which the following is a specification.

This invention relates to improvements in aircraft and has reference to aerial machines comprising in combination in a single unit an aerostat element and an aeroplane element. The present invention differs, in principle, from prior propositions involving the use of both aerostatic and aeroplane elements. Hitherto where the two features have been combined the machine as a whole has depended for its buoyancy upon either the aerostat alone—where the planes have been used for steering and maneuvering—or upon both the aerostat and the planes. A machine constructed in accordance with my invention should be considered primarily as an aeroplane, the aerostat being used for the purpose of giving the aeroplane a larger radius of action. That is to say, the aerostat is not necessary for the support of the machine in flight but is utilized to give the machine the ability to rise rapidly while during subsequent flight the aerostatic effect may be and is intended to be, destroyed by the use of the hydrogen or other gas as fuel for the engines. In other words a machine according to my invention starts its flight as a combined aeroplane and aerostat but may finish its flight purely as an aeroplane. The invention may therefore be defined as an aerial machine comprising in combination an aerostat, supporting planes themselves capable of supporting the machine during flight and means for utilizing the gas of the aerostat as fuel for the engines of the machine during flight and thus reducing or destroying the aerostatic effect.

A machine in accordance with my invention has the manifest theoretical advantages in that at starting by reason of the aerostatic element, it can take a greater load, while it can be transformed into an aeroplane at will by the consumption of the gas. It should be noted that the broad idea of feeding engines by means of the gas used in the aerostat is not new *per se* since it has been proposed previously in purely aerostatic machines to use the gas from the aerostat in proportion as the weight of the vessel as a whole diminished owing to the consumption of the ordinary fuel so that the aerostatic effect remained constant.

The planes of the aeroplane element of my improved machine may be disposed in two or more pairs and be of monoplane, biplane or triplane type and the size and consequently the buoyancy of the balloon or aerostat element may be such as to materially assist in supporting the machine and its load although not necessarily sufficient to support the whole weight at any time without the aid of the aeroplane element.

The invention is illustrated diagrammatically in the accompanying drawing. The gas may be contained within the aerostat envelop or outer casing 1—which is preferably of rigid or semi-rigid type—in ballonnets 2 which when full substantially fill the envelop or outer casing and means such as an air pump 3 may be provided to force air into the envelop so that as the gas is consumed its place will be taken by air at the required pressure. The ballonnets are all coupled by means of pipes 5 to pipe 4 which leads to a mixing chamber or carbureter 6 and a control valve 7 may be provided to control the flow of gas to the engine. I also propose to use petrol or other fuel for use in the engine in addition to the gas of the aerostat. The constructional details of the machine are obviously capable of wide modification and it will be understood that the area and arrangement of plane surface provided may be and preferably will be such as to permit a steady descent in the event of engine failure. The car or structure 8 carrying the engines and mechanism and the pilot and other personnel may be of boat like form so that in the event of descent upon water the car can be cut away or separated from the main structure and used as a life boat.

It will be understood that the diagram does not pretend to show a practical structure but is a mere diagram for illustrating the broad principles of my invention by means of which the range of the machine will be increased.

What I claim and desire to secure by Letters Patent is:—

A flying machine including a body, wings attached to said body, a propeller, driving means therefor, a gas reservoir located above said body, the gas therein serving to assist in an initial rising of the flying machine and subsequently in supplying fuel for said driving means, and means for supplying air to said reservoir in proportion to the volume of gas drawn therefrom by the driving means.

In testimony whereof I affix my signature.

HENRY WILSON-FOX.